W. H. DEAN.
COMBINATION PIPE CUTTER AND COUPLING SPLITTER.
APPLICATION FILED FEB. 23, 1917.
1,244,299.
Patented Oct. 23, 1917.
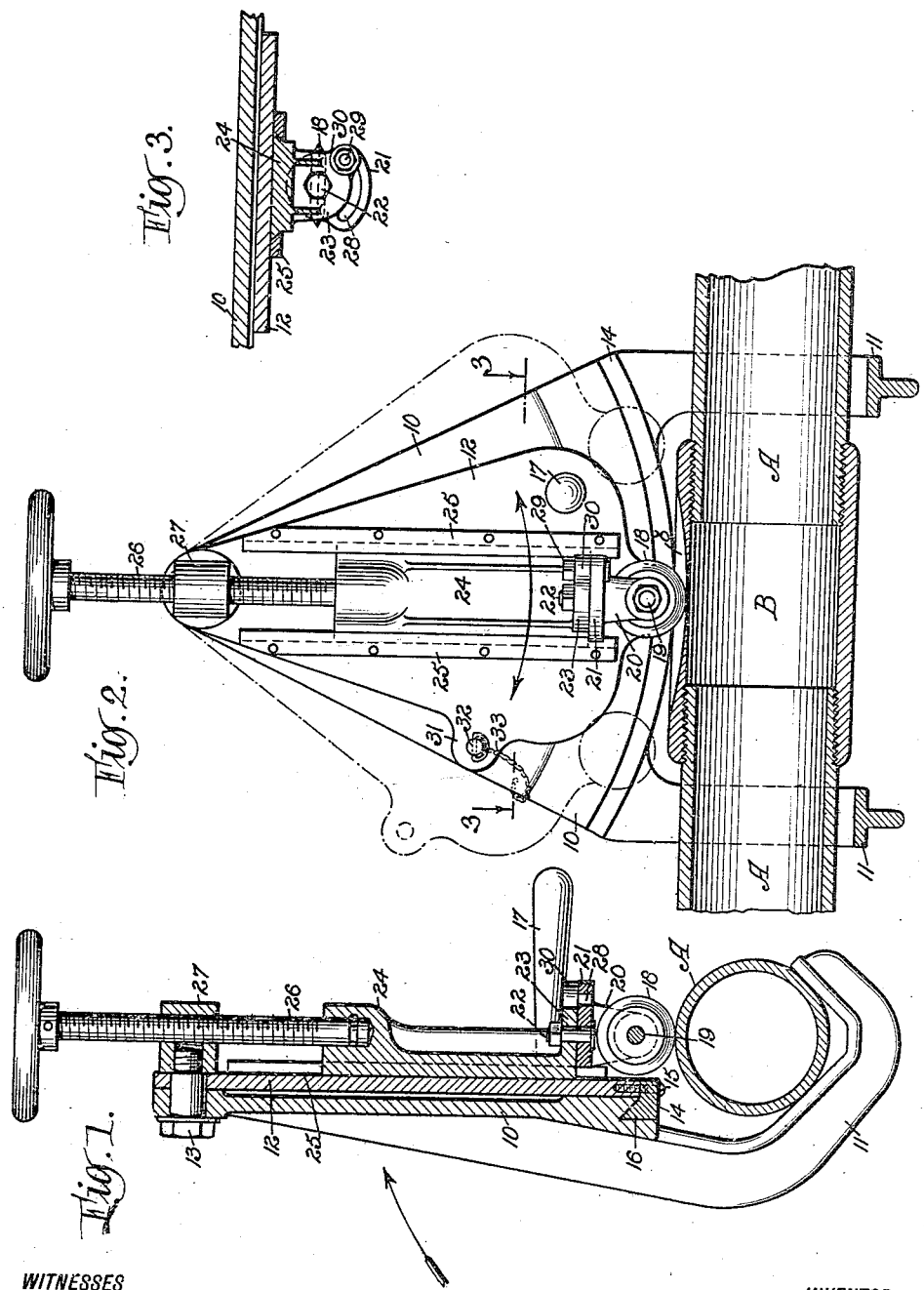
WITNESSES
Frederick Diehl.
J. L. McAuliffe
INVENTOR
William H. Dean
BY Munn & Co
ATTORNEYS

UNITED STATES PATENT OFFICE.

WILLIAM HENRY DEAN, OF SIOUX CITY, IOWA.

COMBINATION PIPE-CUTTER AND COUPLING-SPLITTER.

1,244,299.          Specification of Letters Patent.          Patented Oct. 23, 1917.

Application filed February 23, 1917. Serial No. 150,571.

*To all whom it may concern:*

Be it known that I, WILLIAM HENRY DEAN, a citizen of the United States, and a resident of Sioux City, Leeds Station, in the county of Woodbury and State of Iowa, have invented a new and Improved Combination Pipe-Cutter and Coupling-Splitter, of which the following is a full, clear, and exact description.

An important object of my invention is to provide a tool that may be readily applied to a pipe and adjusted and operated as a pipe cutter or for the purpose of producing a slit longitudinally in a pipe coupling, so that a cold chisel or like tool may be entered and caused to split the coupling. The object stated is attained by a tool including a frame member having means to engage the pipe and a cutter-carrying member that may be given guided pendulous movements, a frame adapted to engage a pipe or the like to permit bodily turning movement of the frame about the axis of the pipe and a cutter-carrying element mounted on the frame to partake of said bodily movement so that the tool constitutes a pipe-cutter, said carrying element being pivotally mounted on the frame that it may be given swinging movement over the face of the frame, a cutter on said carrier being adjustable to either of two positions at right angles to each other to accord with the bodily movement of the frame and carrier to act as a pipe cutter, or to accord with the swinging movement of the carrier over the face of the frame to produce a longitudinal slit in a pipe coupling.

The nature of the invention and its advantages will more clearly appear as the description proceeds.

Reference is to be had to the accompanying drawings forming a part of this specification in which similar reference characters indicate corresponding parts in all the views.

Figure 1 is a transverse vertical section of a tool embodying my invention, showing the same adjusted for use as a pipe cutter;

Fig. 2 is a front view of the tool showing the same adjusted for producing a longitudinal slit in a pipe coupling;

Fig. 3 is a detail in cross section on the line 3—3, Fig. 2.

In constructing a practical embodiment of my invention in accordance with the illustrated example, a frame is provided which advantageously is in the form of a plate 10, tapering upwardly and provided at its lower end with suitable pipe-engaging means such as hooks 11, adapted to be positioned beneath a pipe A. A cutter-carrying element 12, which also advantageously is in the form of a plate, is supported at the front of the plate 10, and is secured at its upper end thereto by a pivot 13, so that the said carrier plate may be given pendulous movements over the face of the plate 10. To guide the cutter-carrying plate in its pendulous movements, suitable guiding means are provided, there being employed for the purpose, in the illustrated example, a curved bar 14 secured to the lower edge of the plate 12 by suitable fastening means, there being indicated a screw 15 in Fig. 1; and said bar has a lip 16 which may be V-shaped in cross section to be received in a correspondingly shaped groove in the lower edge of the plate 10. The curves of the bar 14 and the mating groove in the plate 10 are struck with the pivot 13 as a center.

Suitable means is provided to manually actuate the plate 12; as, for example a handle 17, whereby the plate 12 may be swung back and forth from the full line position of Fig. 2 to the indicated dotted line positions.

A roller cutter 18 is carried by the plate 12 at the bottom, the axial pin 19 of which passes through depending spaced bracket plates 20 on the under side of a plate 21 which is secured by a vertical pivot 22 to the foot 23 on a slide block 24, said block having guided movement between retaining strips 25 suitably secured to the face of the plate 12. An actuating screw 26 is swiveled to the upper end of the slide block 24 and has threaded engagement with a block 27 which advantageously is secured in position by the pivot pin 13 as shown in Fig. 1. The screw thus serves to advance the cutter 18. The pivot 22 permits of the cutter 18 being given a quarter turn from the position illustrated in Fig. 1 disposed transversely of a pipe A for cutting the latter to a position at right angles to the position of Fig. 1 as shown in Fig. 2, so that the cutter is adapted to produce a slit *b* in the coupling B of pipe sections A—A. To secure the cutter 18 in adjusted position a bolt 29 extends through an ear 30 on the foot 23 and through an arcuate slot 28 in the bracket plate 21. When the tool is to be used as a pipe cutter, it is desirable to establish a fixed relation between the plate 10 and the pendulous plate 12 so that the latter may have no movement on its pivot 13. Any suitable means may be employed for the purpose, there being shown a pin 32 secured by a chain 33 to the plate 12 and adapted to be passed through registering pin holes in the plate 10 and in an ear 31 on the plate 12.

With the pin 32 inserted and the cutter 18 positioned as in Fig. 1, the complete tool is bodily vibrated for the cutting of a pipe, the cutter being gradually advanced through the medium of the screw 26. With the pin 32 removed and the cutter positioned as in Fig. 2, the plate 12 is given an oscillating movement through the medium of the handle 17. The form and dimensions of the parts are such that a slit $b$ may be produced in the coupling B so that the slot at the center will extend through the coupling for splitting the same. At the same time the cut will not have such a depth at the ends as to extend into the threads of the pipe sections.

Having thus described my invention I claim as new, and desire to secure by Letters Patent:

1. A tool of the class described including a frame having means adapted to engage a pipe or the like to permit a bodily turning movement of the frame about the axis of the pipe, a cutter-carrying element so mounted on the frame as either to partake of said bodily movement, or to be given swinging movement over the face of the frame, and a cutter on said carrier and adjustable thereon to either of two positions at right angles to each other to accord with either of the said movements of said carrying element.

2. A frame having a seat for a pipe, a cutter opposite the said seat and placed to accommodate a pipe between the seat and cutter, an element carrying said cutter and pivoted on the frame to have a swinging movement back and forth, and means on said element to feed said cutter to effect a concave cut in the pipe by the swinging of said element.

3. A combined cutting and slitting tool including a frame, means to position the same on a pipe for turning about the axis of the pipe, an element mounted on the frame and adapted either to be oscillated over the face of the frame or to partake of the said bodily movement of the latter, and means to position a cutter on said element either in the plane of oscillation of said element to produce a slit in the pipe or in a position at right angles to the said plane of oscillation to act as a pipe cutter by the said turning movement of the frame.

4. In a cutting tool of the class described, a frame having means thereon adapted to engage a pipe, a cutter-carrying element pivotally connected at its upper end with said frame, co-acting guide means on the said frame and carrier element at the lower end of the latter and disposed in a curve struck with the pivot of the said element as a center, a slide block having guided movement on the face of said element, an actuating screw swiveled to said slide block, a block on the said element at the pivot thereof with which said screw has threaded engagement, a bracket at the lower end of said slide block, a roller cutter revolubly supported in the bracket, a vertical pivot connecting said bracket with the slide block so that the bracket may turn through an angle to dispose the cutter in either of two positions at right angles to each other, means to secure the bracket in the adjusted position, and means to establish a fixed relation between the cutter-carrying element and the frame.

WILLIAM HENRY DEAN.

Copies of this patent may be obtained for five cents each, by addressing the "Commissioner of Patents Washington, D. C."